Sept. 29, 1959     P. F. RICHARDSON     2,906,564
PRELOADING BEARINGS ON A TRACK ROLLER ASSEMBLY
Filed Nov. 6, 1956     2 Sheets-Sheet 1
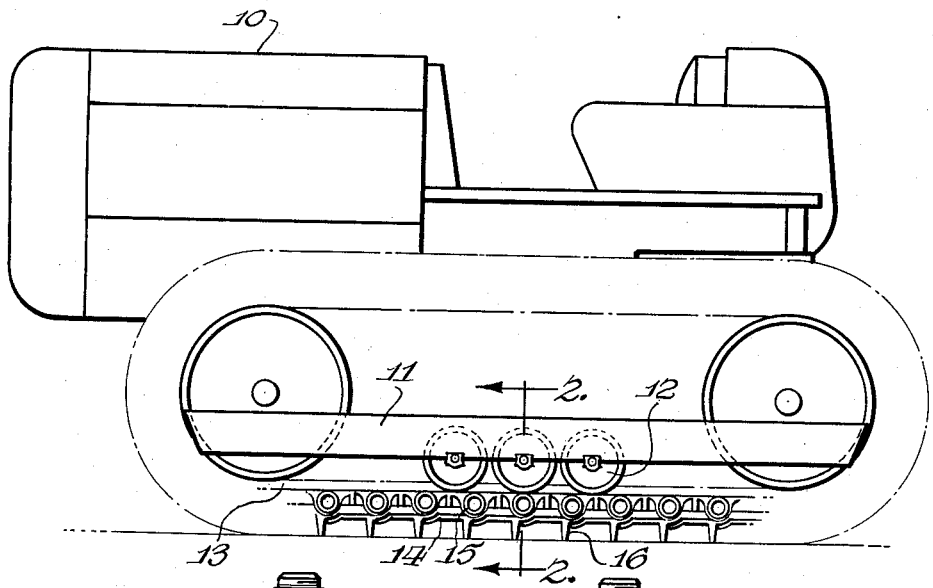
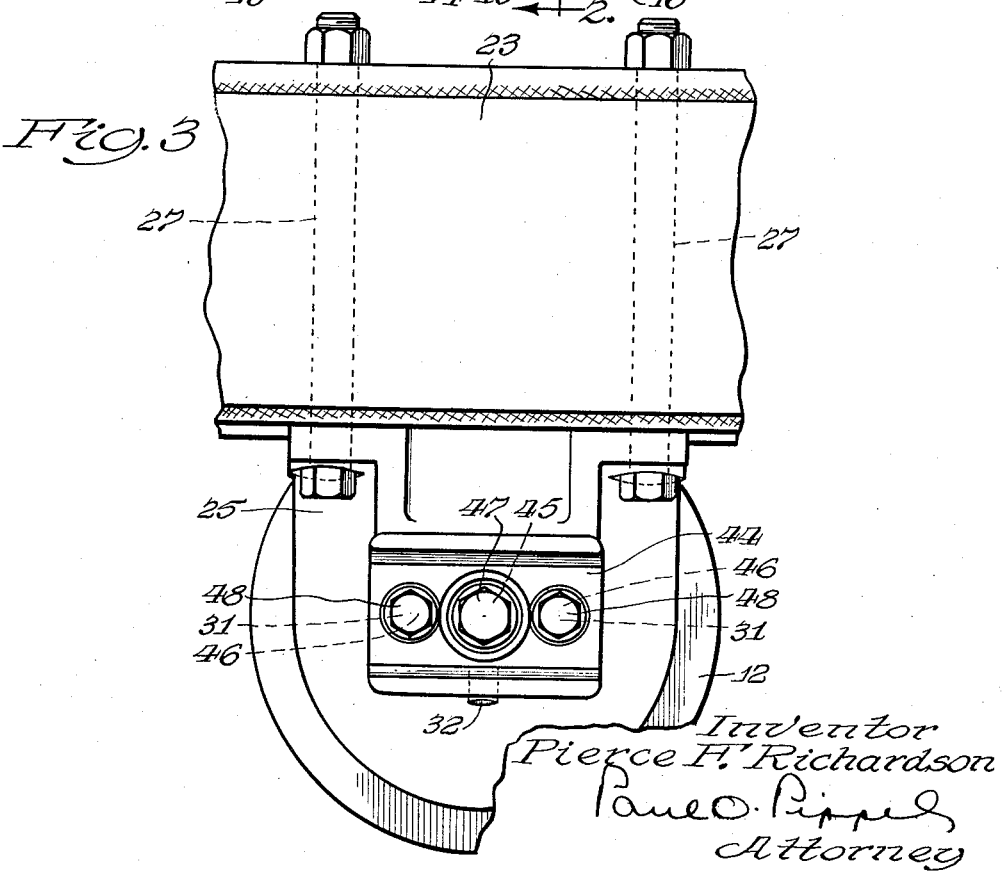

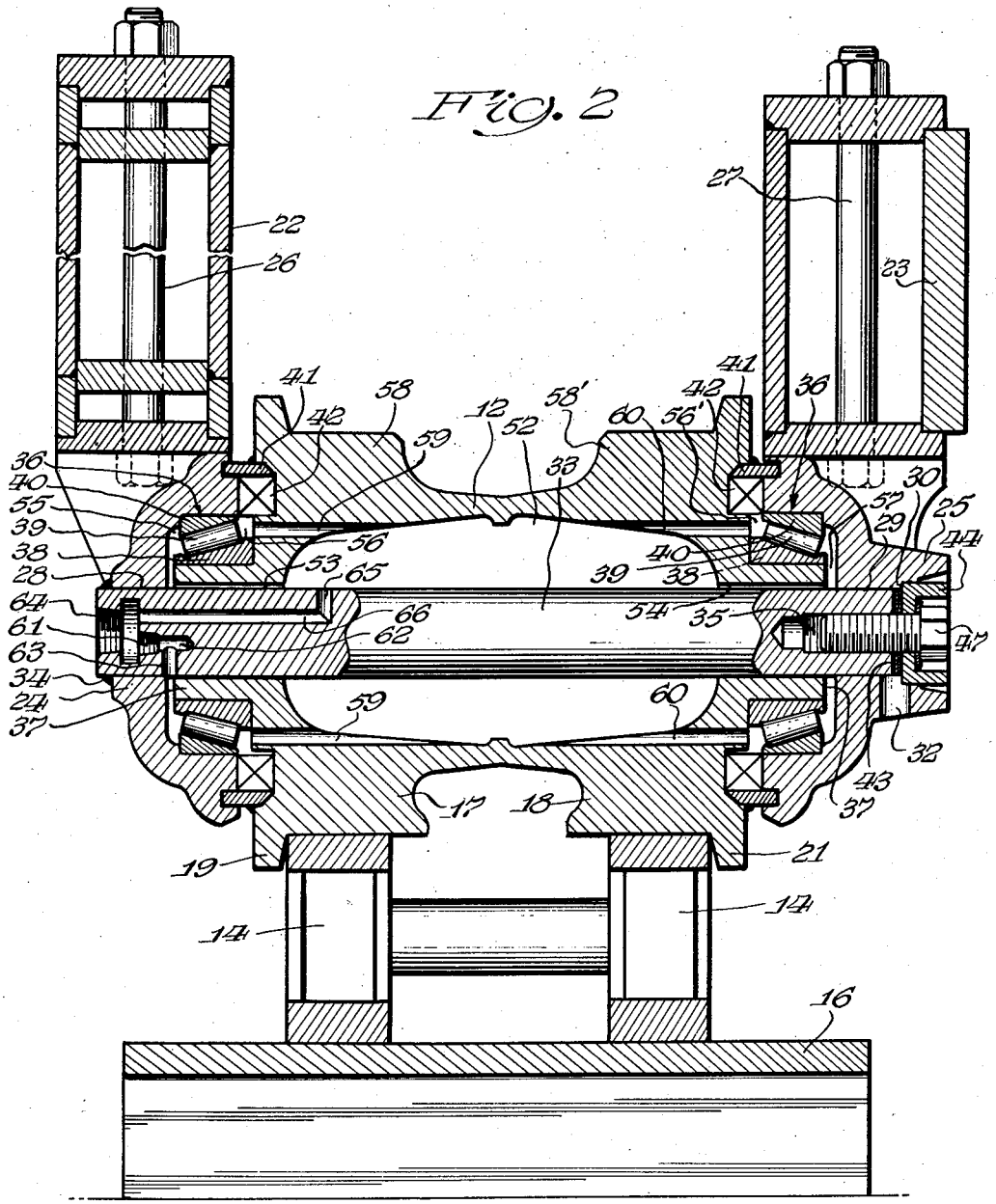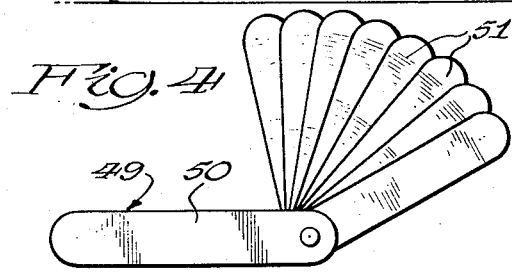

400; text-align:left">United States Patent Office 2,906,564
Patented Sept. 29, 1959

2,906,564
PRELOADING BEARINGS ON A TRACK ROLLER ASSEMBLY

Pierce F. Richardson, North Barrington, Ill., assignor to International Harvester Company, a corporation of New Jersey Application November 6, 1956, Serial No. 620,602

4 Claims. (Cl. 308—15)

This invention relates to vehicles and is primarily concerned with a track roller assembly for a crawler tractor.

The object of the invention is to provide an apparatus and method for preloading the roller bearing units of a track roller assembly in a single operation thus enabling a great saving of the assembler's time and effort.

The foregoing and other objects of the invention will be apparent from the construction and arrangement illustrated in the accompanying drawings wherein:

Figure 1 is a diagrammatic side elevational view of a crawler type vehicle drawn to small scale to illustrate the environment for the invention, Figure 2 is a vertical sectional view taken transversely through a track frame and longitudinally through a track roller assembly mounted on such frame and constructed according to this invention, the view being taken substantially at the plane indicated by the line 2—2 in Figure 1.

Figure 3 is a fragmentary side elevational view of a track frame having the roller assembly of Figure 2 mounted thereon, the roller assembly appearing in end elevation, and Figure 4 is a view of one form of feeler gauge.

Accurate assembly of a roller bearing unit means greater wear of the unit and therefore longer life of the unit. Accurate assembly of a roller bearing unit is when the rollers are in contact with the outer race of the unit. On a track roller assembly it is impossible to know when the rollers of each roller bearing unit are in contact with the outer race of the unit. If the roller bearing units are too loose or too tight this will cause fatigue of the metal of the outer race by compression. Therefore preloading of roller bearing units has been resorted to in order to insure that there is contact between the rollers and the outer race of each unit.

In the past the roller bearing units of a track roller assembly have been preloaded by placing a number of shims between the shaft and the removable bracket and bolting the removable bracket to the shaft. A string was wrapped around the roller and a spring type scale was attached to the string. The scale was manually pulled downward to determine the torque on the roller. This was the means of measuring the preload on the roller bearings. Shims had to be subtracted or added to the shims already on the track roller assembly three or four and possibly five times before the proper preload on the roller bearing units was obtained. Thus every time shims were added or subtracted the removable bracket and its attaching bolt had to be removed from the track roller assembly. Thus this way of preloading roller bearing units was troublesome and took a lot of time.

The invention proposes an apparatus and method of preloading roller bearing units of a track roller assembly. The invention is comprised of a removable bracket having an opening and a seat extending across the opening and a hole arranged at right angles to the axis of the opening and in communication with the opening and a bar disposed in the seat and a threaded securing element extending through the bar and in threaded engagement with a recess in a shaft. The removable bracket and bar and securing element are placed on the remaining part of the track roller assembly and a predetermined preload is placed upon the roller bearing units by tightening the securing element the necessary amount. A measuring means is inserted in the hole in the removable bracket to measure the space between the adjacent end of the shaft and the bar and thus determine the number of shims required to fill the space. The bar and securing element are then removed from the remaining part of the track roller assembly and the required number of shims placed in the opening in the removable bracket against the shaft. The bar is then placed in the seat of the removable bracket and then the securing element is inserted through the bar and threaded in the recess in the shaft. Thus the roller bearing units of a track roller assembly may be properly preloaded in a single operation. Thus the preloading is done quickly, simply and easily with a great saving of the assembler's time.

In the drawings, 10 generally designates a vehicle illustrated as a crawler tractor having a track frame 11 mounting a plurality of track rollers 12 which roll upon the lower flight of an endless track 13. This track comprises a plurality of links 14 pivotally connected by pins 15, and ground-engaging shoes 16 are respectively secured to laterally-spaced pairs of these links in the conventional manner. In Figure 2 it can be seen that the track links 14 are arranged in two laterally-spaced rows and that each row of these links while in the ground-engaging flight of the track forms an articulated rail for engagement by rims 17 and 18 of the track rollers. Flange portions 19 and 21 of the rims 17 and 18 maintain the rollers upon these articulated track rails. There is a track frame 11 on each side of the vehicle. These track frames, together with tracks and rollers associated therewith, are essentially identical. This description will be confined to the details of a single roller assembly on one track frame. The track frame 11 comprises a pair of laterally-spaced box sections 22 and 23 held rigidly in their relative positions by structure not shown since it is not essential to the disclosure of this invention. The track roller assembly is comprised of a pair of spaced brackets 24 and 25 which are secured to the undersides of the frame's box sections 22 and 23 by bolts 26 and 27. The bracket 24 is provided with an opening 28 and the bracket 25 is provided with an opening 29 and a rectangular-shaped seat 30 extending across the opening 29 and a pair of threaded recesses 31 on opposite sides of the opening in the seat having their axes parallel to the axis of the opening 29 and a hole 32 is in transverse communication with the opening 29 and has its axis at right angles to the axis of the opening 29. A shaft 33 is disposed in the openings 28 and 29 in the brackets 24 and 25 respectively and has one end fixedly secured to the bracket 24 by a welded connection 34 and is provided with a threaded recess 35 in its other end. A pair of roller bearing units 36 are disposed over the hubs 37 of the roller and are positioned in the brackets 24 and 25. Each roller bearing unit is comprised of an inner race 38, rollers 39 and an outer race 40. An annular ring 41 is welded to the roller 12 adjacent its extremities and an annular seal 42 is carried in an annular recess in the roller adjacent each ring and slidably bears against the adjacent one of the brackets. A plurality of filler elements or shims 43 are disposed in the opening 29 in the bracket 25 against the adjacent end of the shaft 33. A rectangular-shaped bar 44 is provided with an opening 45 and a pair of holes 46 on opposite sides of the opening and the bar is disposed in the seat 30 in the bracket 25 against the shims 43. A threaded securing element such as a cap screw 47 is disposed in the opening 45 in the bar 44 and is in threaded engagement with the recess 35 in the shaft 33. A pair of securing elements such as cap screws 48 are disposed in the holes 46 in the bar 44 and are in threaded engagement with the recesses 31 in the bracket 25.

The method of preloading the pair of roller bearing units 36 of a track roller assembly for a new crawler tractor is as follows: The seals 42 are pressed into the recesses of the roller 12 and the annular rings 41 are welded to the roller. The shaft 33 is then disposed in the opening 28 in the bracket 24 and the weld connection 34 made. The outer race 40 is free and the rollers 39 are nonremovably mounted on the inner race 38. The outer races 40 of the roller bearing units 36 are then pressed into the brackets 24 and 25 and the inner races 38 of the roller bearing units are pressed on the hubs 37 of the roller 12. The roller 12 is then placed on the shaft 33 and the bracket 25 is mounted on the shaft by the opening 29 receiving the shaft. The bar 44 is then placed in the seat 30 of the bracket 25 and then the cap screws 47 and 48 are passed through the opening 45 and holes 46 in the bar and threaded in the recesses 35 and 31 in the shaft 33 and bracket 25. The cap screw 47 is then tightened with a torque wrench until a predetermined load is placed upon the pair of roller bearing units 36. A satisfactory predetermined load on the roller bearing units 36 has been found to be about 35 inch pounds. A feeler gauge 49 is then inserted in the hole 32 in the bracket 25 to determine the number of shims 43 required to fill the space between the adjacent end of shaft 33 and the bar 44. The right end of the shaft 33, as viewed in Fig. 2, registers with the feeler-gage-receiving hole 32 to facilitate this measuring step. The feeler gauge 49 is comprised of a handle 50 and a plurality of measuring elements 51 pivotally connected to the handle. The measuring elements 51 have different thicknesses. After the space between the shaft 33 and bar 44 has been measured the cap screws 47 and 48 are removed from the shaft and the bracket 25 and the bar 44 and the bar is removed from the bracket. The required number of shims 43 are then placed in the opening 29 in the bracket 25 against the shaft 33. The bar 44 is then placed in the seat 30 of the bracket 25 against the shims 43. The cap screws 47 and 48 are then passed through the holes 45 and 46 in the bar 44 and then threaded in the recesses 35 and 31 in the shaft 33 and the bracket 25. The cap screw 47 can then be tightened fully without increasing the 35 inch pound load on the bearings 36. The track roller assembly is now a complete subassembly and this subassembly is installed on the tractor by attaching it to the box sections 22 and 23 by means of bolts 26 and 27.

The roller 12 contains a cavity 52 which cooperates with the non-rotatable shaft 33 in forming a lubricant reservoir. Axial bores 53 and 54 in the roller are slightly oversize with respect to the shaft 33. Bore 53 provides communication between the lubricant reservoir and a radial space 55 which, in turn, communicates with the recess 56 at the outer end of the roller. Similar communication is provided by the bore 54 through a radial passage 57 with the recess 56' in the inner end of the roller. Roller web 58 contains lubricant-conducting passage means in the form of a plurality of bores 59 communicating between the lubricant reservoir and the bottom of the recess 56. A plurality of bores 60 corresponding to the bores 59 are provided in the web 58' to communicate between the lubricant reservoir and the bottom of the annular recess 56'. A flowable lubricant is introduced into the roller cavity 52 by means of a conventional lubricant gun having a threaded coupling attachable to a threaded section 61 of an L-shaped passage 62—63 in the shaft 33. Access to the threaded section 61 is had when a threaded closure plug, not shown, is removed from a threaded recess 64 in the outer end of the shaft 33. Lubricant forced inwardly through the L-shaped passage 62—63 flows radially through the annular space 55 and between the rollers 39 of the bearing unit 36 at the fixed bracket thence through the passages 59 into the cavity 52. As the cavity fills with lubricant a portion thereof will migrate through the passages 54 and 60 into contact with the rollers 39 of the anti-friction bearing unit 36 at the removable bracket. When the cavity 52 becomes full, continued introduction of lubricant through the L-shaped passage 62—63 will cause an excess of lubricant to be forced outwardly through an L-shaped passage 65—66. When the operator notes spewing of lubricant from passage leg 66 into the recess 64 this will manifest that the roller cavity and passages have been filled, whereupon the gun will be detached from the threaded passage portion 61, and the closure plug, not shown, will be turned into the threaded recess 64. Rotation of the roller 12 and consequent planetation of the tapered rolling elements 39 will cause pumping of the lubricant from the cavity 52 through the passages 53 and 54 thence radially through the spaces 55 and 57 between the circumferentially spaced roller elements 39 and back to the reservoir through the passages 59 and 60. This assures turbulation of the lubricant and an adequate supply thereof to the bearing units 36.

An old type track roller assembly on a crawler tractor already in use may be removed from the tractor by removing bolts 26 and 27 and a track roller assembly having preloaded roller bearing units as shown in Figure 2 installed on the tractor by inserting the bolts in the box sections 22 and 23 of the track frame.

The apparatus and method for preloading the roller bearing units of the track roller assembly shown and described in this application is an improvement over the track roller assembly disclosed in the patent to Bechman No. 2,690,933.

What is claimed is:

1. A track roller assembly comprising a pair of spaced brackets and one of the brackets being provided with an opening and a seat extending across the opening and a hole in transverse communication with the opening, a shaft provided with a recess in one end and said one end being disposed in the opening in said one of the brackets and having its other end secured to the other of the brackets, the one end of the shaft being in registry with the transversely communicating hole, a roller rotatably mounted on the shaft, a pair of roller bearing units disposed over the ends of the roller and positioned in the brackets, a plurality of filler elements disposed in the opening in said one of the brackets against said one end of the shaft, a bar provided with an opening disposed in the seat of said one of the brackets against the filler elements, and a securing element disposed in the recess and opening in the shaft and the bar.

2. A track roller assembly comprising a pair of spaced brackets and one of the brackets being provided with an opening and the other of the brackets being provided with an opening and a seat extending across the opening and a pair of recesses on opposite sides of the opening having their axes parallel to the axis of the opening and a hole in communication with the opening having its axis at right angles to the axis of the opening, a shaft disposed in the openings in the brackets and having one end fixedly secured to said one of the brackets and provided with a threaded recess in its other end which end is in registry with said bracket hole, a roller rotatably mounted on the shaft, a pair of roller bearing units disposed over the ends of the roller and positioned in the brackets, a plurality of shims disposed in the opening in said other of the brackets against said other end of the shaft, a bar provided with an opening and a pair of holes on opposite sides of the opening disposed in the seat of said other of the brackets against the shims, a threaded securing element disposed in the recess and opening in the shaft and the bar, and securing elements disposed in the recesses and holes in said other of the brackets and the bar.

3. The method of preloading a pair of roller bearing units of a track roller assembly including a shaft having a threaded recess in one end, a pair of brackets of which one is provided with an opening and a seat extending across the opening and a hole in communication with the opening, a roller, a plurality of filler elements, a bar having an opening, and a securing element having a threaded portion complemental with said threaded recess; such method comprising the steps of securing the other end of the shaft to the other of the brackets, placing the pair of roller bearing units in the brackets and over the ends of the roller and placing the roller on the shaft, placing the bar in the seat of said one of the brackets, projecting the threaded portion of the securing element through the openings of the bar and bracket into the shaft recess, rotating the securing element to advance it into the shaft recess to press the bar against the bracket seat while pulling on the shaft to force the brackets toward one another until a predetermined load is placed upon the pair of roller bearing units, inserting a measuring means in the hole in said one of the brackets to determine the number of filler elements required to fill the space betwen said one end of the shaft and the bar, removing the bar and the securing element from said one of the brackets and the shaft, placing the required number of filler elements in the opening in said one of the brackets against the one end of said shaft, again placing the bar in the seat in said one of the brackets, again projecting the threaded portion of the securing element through the openings of the bar and bracket into the shaft recess, and again rotating the securing element to advance it into said recess to a limit determined by the filler elements to attain said predetermined load on the roller bearing units.

4. The method of preloading a pair of roller bearing units of a track roller assembly including a shaft having a threaded recess in one end, a pair of brackets one of which is provided with an opening and a seat extending across the opening and a pair of threaded recesses within such seat on opposite sides of the opening and a hole in communication with and having its axis at right angles with the axis of the opening, a roller having a hub at each end, a plurality of shims, a bar having an opening and a pair of holes on opposite sides of the opening, and three screws of which one has a threaded portion complemental with the threaded shaft recess and of which the other two screws have threaded portions complemental with the threaded recesses of the one bracket; such method comprising the steps of securing the other end of the shaft to the other of the brackets, placing the pair of roller bearing units in the brackets and over the hubs of the roller and placing the roller on the shaft, placing the bar in the seat of said one of the brackets, inserting the threaded portion of the one screw through the openings of the bar and bracket into the shaft recess, rotating the one screw to advance it into the shaft recess to press the bar against the bracket seat while pulling on the shaft to force the brackets toward one another until a predetermined load is placed upon the pair of roller bearing units, inserting a measuring means in the hole in said one of the brackets to determine the number of shims required to fill the space between said one end of the shaft and the bar, removing the bar and screw from said one of the brackets and the shaft, placing the required number of shims in the opening in said one of the brackets against said one end of said shaft, again placing the bar in the seat in said one of the brackets, again projecting the threaded portion of the one screw through the openings of the bar and bracket into the shaft recess, again rotating this one screw to advance it into the shaft recess to a limit determined by the filler elements to reestablish said predetermined load on the roller bearing units, and inserting the other two screws through the bar holes and turning such screws into the threaded recesses of the one bracket.

References Cited in the file of this patent
UNITED STATES PATENTS

| | | |
|---|---|---|
| 2,283,871 | Norelius | May 19, 1942 |
| 2,351,909 | Beretish et al. | June 20, 1944 |
| 2,690,933 | Bechman | Oct. 5, 1954 |